3 Sheets—Sheet 1.

G. R. CLARKE,

Assignor, by mesne assignments, to C. CRANSTON & E. J. STERLING.

Paper-Cutting Machine.

No. 8,736. Reissued June 3, 1879.

WITNESSES:

Chas. C. Stetson
E. B. Bolton

INVENTOR

George R. Clarke
by his attorney
Thomas D. Stetson

3 Sheets—Sheet 2.

G. R. CLARKE,

Assignor, by mesne assignments, to C. CRANSTON & E. J. STERLING.

Paper-Cutting Machine.

No. 8,736. Reissued June 3, 1879.

WITNESSES:

E. B. Bolton

Chas. C. Stetson

INVENTOR:

George R. Clarke by his attorney

Thomas D. Stetson

3 Sheets—Sheet 3.
G. R. CLARKE,
Assignor, by mesne assignments, to C. CRANSTON & E. J. STERLING.
Paper-Cutting Machine.
No. 8,736. Reissued June 3, 1879.
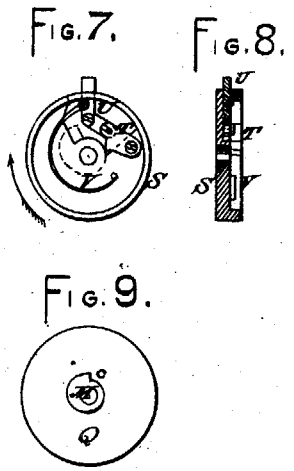
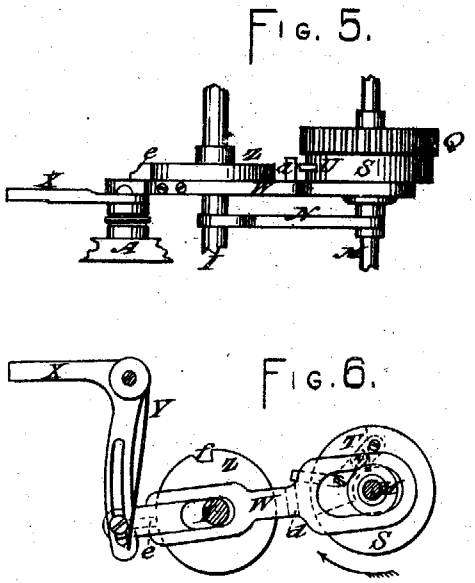
WITNESSES:
Chas. C. Stetson
E. B. Bolton
INVENTOR:
George R. Clarke
by his attorney
Thomas D. Stetson.

UNITED STATES PATENT OFFICE.

GEORGE R. CLARKE, OF BROOKLYN, NEW YORK, ASSIGNOR, BY MESNE ASSIGNMENTS, TO CHARLES CRANSTON AND EZRA J. STERLING.

IMPROVEMENT IN PAPER-CUTTING MACHINES.

Specification forming part of Letters Patent No. 184,699, dated November 28, 1876; Reissue No. 8,736, dated June 3, 1879; application filed January 10, 1879.

*To all whom it may concern:*

Be it known that I, GEORGE R. CLARKE, of Brooklyn, county of Kings, and State of New York, have invented a certain new and useful Self-Clamping Paper-Cutting Machine, of which the following is a description.

I employ a combination of a clamp for holding the paper while being cut and a knife or cutter that said clamp will press upon and hold the paper, whatever its quantity, before the knife can operate upon it, and the pressure of the clamp on the paper will always be in a corresponding ratio to the resistance offered to the knife, and the knife will move entirely out of the way of the paper before the clamp can rise and permit it to be fed forward.

I also employ an automatic clutch and the combination of the same with the driving-shaft of the machine, whereby the driving-shaft may be released from the other mechanism when desirable, and, after having been released, will, at the proper time, automatically re-engage with the said mechanism; also, I combine with such clutch a lever and a cam, whereby, after each cutting operation is completed and the clamp has released the paper, the driving-shaft is automatically disengaged from the other mechanism, and the latter is locked in position until the lever is manipulated by the operator in charge of the machine, the driving-shaft being meanwhile free to revolve.

The following is a description of what I consider the best means of carrying out the invention.

The accompanying drawings form a part of this specification.

Figure 2:
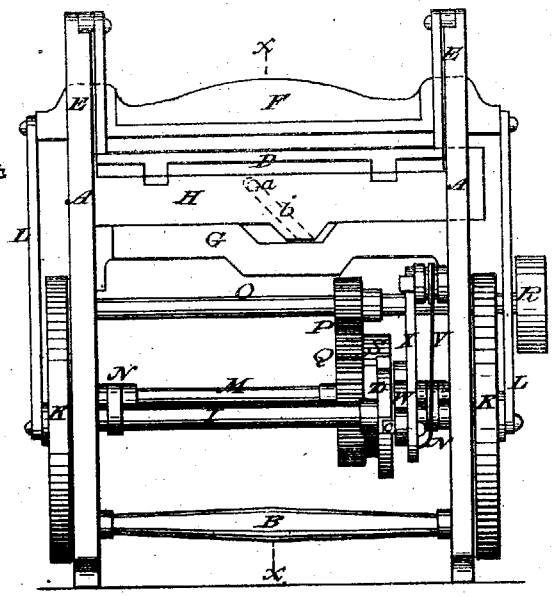
Figure 1:
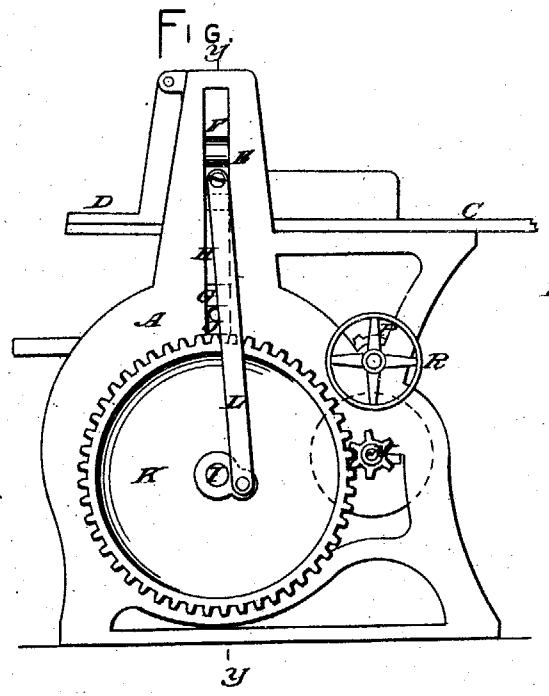
Figure 4:
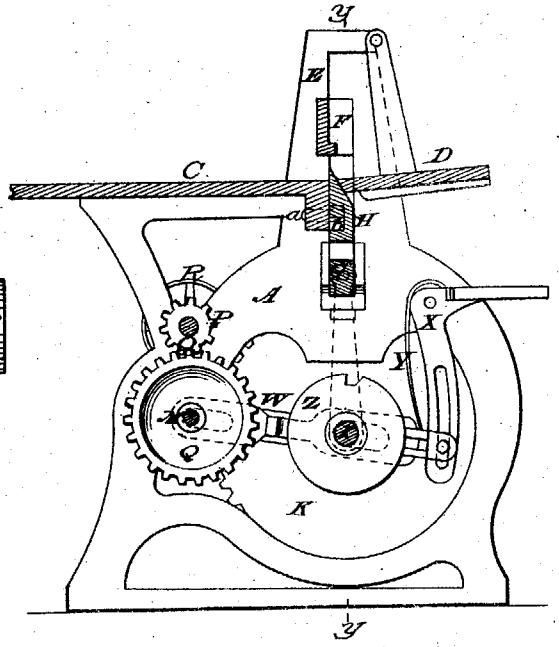
Figure 3:
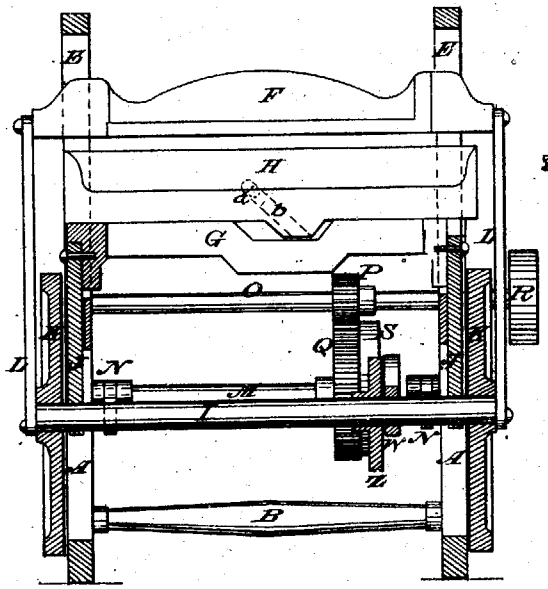

Figure 1 is a side elevation of such machine. Fig. 2 is a back view thereof. Fig. 3 is a vertical longitudinal section of the same on the plane of the dotted line *y y*, Figs. 1 and 4. Fig. 4 is a transverse section taken on the plane of the dotted line *x x*, Fig. 2. Fig. 5 is a plan of the clutch, lever, and cam, by means of which the disengagement and engagement of the driving-shaft with the other mechanism are controlled. Fig. 6 is a side view of the same. Fig. 7 is a side view of the clutch-pulley and clutch. Fig. 8 is a transverse section of the same; and Fig. 9 is a view of that side of the clutch-wheel which engages with the clutch.

Similar letters of reference designate corresponding parts in all the figures.

The frame of this machine consists of side pieces A and stretchers or cross-pieces B.

C designates the table or feed-board, over which the paper to be cut is fed, and D is a gravitating delivery-board, which is hung from standards E extending from the side pieces A, and automatically adjusts itself to the knife, and receives the cut paper, however narrow it may be.

F designates a clamp or clamping-bar, working in housings or guides provided in the standards E, so that it may ascend and descend.

G is a knife-bar, working in housings or guides in the side pieces A, so that it may ascend and descend in the same way.

H is a knife, which is carried by the knife-bar, and which, as it ascends and descends, derives a longitudinal movement from a stationary pin, *a*, working in an oblique slot, *b*, and hence operates on the paper with an upward shearing action.

I is a rotary shaft, supported in bearings at the ends of hangers J, suspended from bearings which are connected to the ends of the knife-bar G. On the ends of this shaft I are large spur-wheels K. Rods L connect the ends of the clamp F with the spur-wheels K at some distance from their center, or with cranks or eccentrics provided at the ends of the shaft I.

M is a secondary or clutch-pulley shaft, which, at the ends, is provided with pinions gearing with the spur-wheels K. Rods N connect this shaft with the shaft I, and preclude the latter from swinging to and fro.

O is the driving-shaft. It may be operated by any suitable means—for instance, by a belt on a pulley, R—and it is provided with a pinion, P, which gears with a clutch spur-wheel, Q, on the clutch-pulley shaft M, as will be presently described more particularly.

In order to describe the operation of these parts, suppose that the clamp F is raised to the fullest extent, and that a pile of paper to be cut is fed over the feed-board C above the knife H. When the clamp is thus raised, the points at which the rods L are connected to the spur-wheels K are in the same vertical plane as the centers of such wheels. The motion of the driving-shaft being communicated to the shaft I, its spur-wheels K are caused to rotate, and, by means of the rods L, the clamp F is brought down on the pile of paper, no matter what may be its thickness, and holds the same securely in place.

As the clamp is prevented by the paper from descending farther, the continued rotation of the spur-wheels K causes them, their shaft, the knife-bar, and knife to ascend, their entire weight being supported by the clamp, to which, also, is imparted the strain due to the resistance offered to the knife by the paper; hence the clamp is held on the paper with a force due to the weight of the cutting mechanism and the resistance offered to the knife.

After the knife completes its upward stroke the continued rotation of the spur-wheels K causes the cutting mechanism to descend, and when such mechanism can descend no farther, by reason of the knife-bar G having descended upon a rest or stop in the fixed frame-work, the continued rotation of the spur-wheels raises the clamp, and permits the paper to be fed forward preparatory to being cut again. Thus not only is the clamp always caused to hold the paper with a force corresponding to the resistance offered to the knife, but the clamp must come down and bear on the pile of paper, be it great or small, before the knife can begin to operate.

I do not confine myself to this precise manner of combining the clamp and knife, as obvious mechanical equivalents may be adopted without departing from the principle of this part of the invention.

On the clutch-wheel shaft M is a clutch which secures thereto the wheel Q, that gears into the pinion P of the driving-shaft O. This clutch consists of a pulley, S, whose inner face is recessed and provided with a pivoted dog, T, which is capable of interlocking with a notch, *c*, in the hub of the spur-wheel Q, which latter is driven by the gear-wheel P on the driving-shaft O.

U is a bell-crank lever, one end of which engages with the dog T, and the other end of which extends outward through the periphery of the pulley S. A spring, V, pressing against the outer arm of said lever, causes the dog to engage with the notch *c* within the hub of the wheel Q.

It is obvious that a spring acting directly on the dog would answer the same purpose. Any suitable contrivance may be used to operate the projecting end of the lever U for the purpose of effecting the disengagement of the clutch-pulley, and hence the cutting mechanism, from the driving-shaft.

I have represented a rod, lever, and cam for this purpose, and will now describe them. W is a rod fitted upon the shafts I and M, and slotted to provide for its longitudinal movement irrespective of them. This rod is provided with two projections, one, *d*, projecting over the periphery of the clutch-pulley S in the way of the projecting end of the lever, and another, *e*, projecting over and bearing against the periphery of the cam Z, arranged on the shaft I. This rod W is operated by means of a lever, X. A spring, Y, applied to said lever X, and abutting against any fixed object, (not shown,) holds the projection *e* against the cam Z. The shape of this cam is such that, after each cutting operation is completed and the clamp is raised from the paper, the projection *e* slips into a recess or notch, *f*. The projection *d* obtrudes itself in the way of the projecting end of the clutch-lever U, and releases the clutch-pulley shaft M from the wheel Q, and allows the latter to rotate freely. Thus the machine is automatically stopped after each cutting operation.

To start the machinery again, the person in charge of the machine operates the lever X by gently raising the horizontal arm shown. This moves the rod W to withdraw the projection *e* from the recess or notch *f*, and the projection *d* being thus removed from contact with the clutch-lever U allows the clutch to reconnect the machinery with the driving-shaft, and again cause the clamp-bar and knife to operate. In this way ample time is afforded for feeding the paper between each cutting operation.

By the mode of operation involved in my machine, the bearing of the clamping-bar upon the pile of paper is made to serve as an abutment or fulcrum for the cutting action. The cutting is certain to occur sooner or later in the revolution of the machine; but before the knife commences to move the clamping-bar presses down upon the paper and holds it firmly. After that is effected the continued operation of the machine causes the knife to move until it strikes the paper.

When the knife meets the resistance of the paper, it induces a still stronger pressure on the clamping-bar. So soon as the paper is severed, and the knife commences to move back, the pressure on the clamping-bar is relaxed. After the knife has been withdrawn entirely out of contact with the pile of paper, and is fully returned to its original position, the further operation of the machine causes the clamping-bar to lift, and, without requiring any attention from the attendant, the pile of paper is set at liberty.

I attach much importance to this mode of operation. It insures that the paper shall always be firmly held while the knife is operating, and for a period before and after its action, and reduces the labor by relieving the attendant from all care in securing the paper and liberating it.

The fact that the bearing of the pressure-bar on the pile of paper is a fulcrum for the action of the knife insures that the pile of paper is compressed and held with a degree of firmness approximately proportional to the resistance encountered by the knife. A small pile of paper, which is easily cut by the knife, will receive but a gentle compressive force from the pressure-bar. An extended surface of hard paper, offering much resistance to the knife, will be held down with a proportionately increased degree of force.

I am aware that machines have been before known in which a clamp was automatically operated in connection with the knife; but those machines depressed the clamp by friction alone, and entailed a great loss of working force, which my invention avoids.

I claim as my invention—

1. The combination, with a knife and a clamping-bar, of operating mechanism, substantially as described, whereby the resistance of the material being cut regulates the pressure of the clamping-bar, and the latter is forced upon the paper with a pressure dependent on the resistance to the motion of the knife, substantially as herein specified.

2. In a paper-cutting machine, a supporting-table supporting the paper on both sides of the line of cut, in combination with a knife having a vertical and longitudinal motion, a clamping-bar, and mechanism connecting and operating the knife and clamping-bar, substantially as described, whereby the clamping-bar becomes an abutment or fulcrum for the cutting operation, as herein specified.

3. The combination, in a paper-cutting machine, with the clamping-bar and knife, of a rotary shaft connected therewith, the said devices being arranged substantially as described, whereby, through the rotation of said shaft, the clamping-bar is first caused to bear upon the paper, and then the knife is caused to act, and the pressure of the clamping-bar is regulated by the resistance encountered by the knife, and through the continued rotation of said shaft the knife is withdrawn before the cut paper is unclamped, substantially as set forth.

4. A clamp-bar, F, and knife H, coupled together, and combined with mechanism, substantially as described, so as to be moved in opposite directions by a single operation, whereby the pressure of the clamp becomes equal to the pressure required to force the knife through the paper, substantially in the manner described.

5. A clamp-bar, F, coupled eccentrically to a shaft, I, the bearings whereof are capable of a vertical movement, combined with a knife, H, coupled directly to said shaft I, whereby a revolution of said shaft forces said clamp downward upon the paper to be severed until resistance overcomes the downward pressure, and the continued revolution of said shaft causes an upward movement of the same and the knife to sever the paper.

6. The clutch consisting of the recessed pulley S, the pivoted dog T and its operating spring, and the lever U, projecting from the pulley S, in combination with a wheel, Q, having a notched or recessed hub, *c*, said wheel being the driving-pinion of a paper-cutter, substantially as herein set forth.

7. The combination, with the clamping and cutting mechanism, of an automatic clutch, S T U V, and a contrivance, *d*, attached to the rod W, for tripping the same after each operation of said mechanism, substantially as and for the purpose set forth.

8. The combination of a clutch, S T U V, the rod W, with its projections *d* and *e*, the cam Z, and a spring, Y, for holding the projection *e* against the said cam, substantially as and for the purpose set forth.

9. The combination, with the said clutch, of said rod W, cam Z, spring Y, and lever X, for operating said rod W, substantially as and for the purpose set forth.

In testimony whereof I have hereunto set my hand this 28th day of December, 1878, in the presence of two subscribing witnesses.

GEO. R. CLARKE.

Witnesses:
W. COLBORNE BROOKES,
CHAS. C. STETSON.